(12) United States Patent
Xu et al.

(10) Patent No.: US 10,512,860 B2
(45) Date of Patent: Dec. 24, 2019

(54) WATER MACHINE WITH UNAFFECTED WATER PURIFICATION UNDER DISASSEMBLY AND USING METHOD THEREOF

(71) Applicant: FUZHOU PINXING TECHNOLOGY DEVELOPMENT CO., LTD, Fuzhou (CN)

(72) Inventors: Daohua Xu, Fuzhou (CN); Zongjin Lan, Fuzhou (CN); Qin Zheng, Fuzhou (CN)

(73) Assignee: FUZHOU PINXING TECHNOLOGY DEVELOPMENT CO., LTD., Fuzhou (CN)

( * ) Notice: Subject to any disclaimer, the term of this patent is extended or adjusted under 35 U.S.C. 154(b) by 0 days.

(21) Appl. No.: 15/773,560

(22) PCT Filed: Nov. 9, 2017

(86) PCT No.: PCT/CN2017/110098
§ 371 (c)(1),
(2) Date: May 4, 2018

(87) PCT Pub. No.: WO2018/121090
PCT Pub. Date: Jul. 5, 2018

(65) Prior Publication Data
US 2019/0076759 A1 Mar. 14, 2019

(30) Foreign Application Priority Data

Dec. 30, 2016 (CN) .......................... 2016 1 1265187

(51) Int. Cl.
*B01D 29/96* (2006.01)
*B01D 35/30* (2006.01)
(Continued)

(52) U.S. Cl.
CPC ............ *B01D 29/965* (2013.01); *B01D 29/15* (2013.01); *B01D 35/306* (2013.01); *C02F 1/001* (2013.01);
(Continued)

(58) Field of Classification Search
CPC ...... B01D 29/965; B01D 29/15; B01D 29/96; B01D 35/306; B01D 35/30; B01D 2201/34; C02F 1/00; C02F 1/001; C02F 2201/004
(Continued)

(56) References Cited

U.S. PATENT DOCUMENTS

2004/0238428 A1 12/2004 Fritze
2014/0144824 A1 5/2014 Shaffer

FOREIGN PATENT DOCUMENTS

CN 203663558 U 6/2014
CN 205549817 U 9/2016
(Continued)

OTHER PUBLICATIONS

KR 100843152 English translation, Winix INC., Jul. 3, 2008.*
(Continued)

*Primary Examiner* — Robert Clemente
*Assistant Examiner* — Akash K Varma
(74) *Attorney, Agent, or Firm* — Gokalp Bayramoglu (57) ABSTRACT

A water machine with unaffected water purification under disassembly includes a filter element device and a filter element main body seat, the filter element device includes a filter element main body and a self-sealing assembly; the filter element main body includes an inner core and an outer shell; the self-sealing assembly includes an upper ceramic sheet and a lower ceramic sheet; the upper and lower ceramic sheets are respectively provided with through ports; the filter element main body seat includes a seat body—and
(Continued)

a water flow switching assembly; the water flow switching assembly includes a sliding body and an elastic member.

13 Claims, 10 Drawing Sheets

(51) Int. Cl.
*C02F 1/00* (2006.01)
*B01D 29/15* (2006.01)

(52) U.S. Cl.
CPC .... *B01D 2201/34* (2013.01); *C02F 2201/004* (2013.01)

(58) Field of Classification Search
USPC .......................................................... 210/232
See application file for complete search history.

(56) References Cited

FOREIGN PATENT DOCUMENTS

| KR | 100843152 | B1 | 7/2008 |
| KR | 101668804 | B1 | 10/2016 |

OTHER PUBLICATIONS

KR 100843152 original foreign document, Winix INC., Jul. 3, 2008.*
CN 203663558 English translation, Shenzhen Chengdelai industrial CO., Jun. 25, 2014.*
CN 203663558 original foreign document, Shenzhen Chengdelai industrial CO., Jun. 25, 2014.*

\* cited by examiner

FIG.10

WATER MACHINE WITH UNAFFECTED WATER PURIFICATION UNDER DISASSEMBLY AND USING METHOD THEREOF

CROSS REFERENCE TO RELATED APPLICATIONS

This application is the national phase entry of International Application PCT/CN2017/110098, filed on Nov. 9, 2017, which is based upon and claims priority to Chinese Patent Application No. 2016112651873, filed on Dec. 30, 2016, the entire contents of which are incorporated herein by reference.

TECHNICAL FIELD

The present invention relates to a water purifier assembly, particularly to a water machine with unaffected water purification under disassembly and using method thereof.

BACKGROUND

The water machines available in the market have a drawback that the faucet must be turned off while assembling and disassembling the filter element main body of the water machine during the use, and when the filter element main body is disassembled, the remaining water in the filter element main body also keeps flowing out continuously. This results in producing water stains both outside and inside the machine, the sanitation of the room and the water machine is affected. The existing water purifiers also have a water purification filter element main body with sealing device. For example, patent CN201482290U discloses a quick-connection filter element main body structure of water purification equipment. The water purifier includes a connector and a filter element device, and an automatic sealing device is arranged on the connector to prevent water leakage when replacing the filter element main body, and it is convenient for the users to replace by themselves. However, this type of filter element main body has a complex structure design and a large size, which is not conducive to the overall layout inside the water purifier, especially in the trend of miniaturization of water purifiers, etc., the structure of the filter element main body is increasingly unable to meet market demands; besides, this solution cannot achieve the disassembly of the filter element main body during the water purification process.

SUMMARY

In order to solve the abovementioned technical problems, the present invention provides a water machine with unaffected water purification under disassembly and using method thereof, the filter element main body can be disassembled and replaced under the normal working condition of the water machine, and the water in the filter element main body would not leak out during the disassembly process. The device has a compact structure, a small size, and is stable in operation.

The technical solution of the present invention is as follows.

A water machine with unaffected water purification under disassembly, including a filter element device and a filter element main body seat. The filter element device includes a filter element main body and a self-sealing assembly sleeved at the bottom of the filter element main body; the filter element main body includes an inner core and an outer shell which are mutually rotatable; the self-sealing assembly includes an upper ceramic sheet and a lower ceramic sheet which can mutually rotate in fitting contact; the upper ceramic sheet and the lower ceramic sheet are respectively provided with a through port; the through port of the upper ceramic sheet communicates with the water outlet of the filter element main body; one of the upper ceramic sheet and the lower ceramic sheet is in linkage with the inner core, and the other is in linkage with the outer shell; the filter element main body seat includes a seat body snap-matched with the filter element device and a water flow switching assembly disposed in the seat body; the water flow switching assembly includes a sliding body and an elastic member slidingly and vertically sleeved with the seat body; the sliding body compresses the elastic member to slide up and down, so that in the water purification state, the external water inlet on the seat body communicates with the water inlet of the filter element main body, and the external water outlet on the seat body communicates with the through ports of the lower ceramic sheet and the upper ceramic sheet. When the filter element main body is disassembled, the connection between the external water inlet and the water inlet of the filter element main body and the connection between the external water outlet and the through port of the lower ceramic sheet are both disconnected, and the external water inlet and the external water outlet are directly connected.

Where, the bottom of the seat body is provided with a water inlet cavity and a water outlet cavity vertically, and a vertical sliding cavity is provided at the upper part; the water inlet cavity communicates with the bottom of the water outlet cavity, and the water inlet cavity and the water outlet cavity respectively communicate with the external water inlet and the external water outlet; the bottom of the sliding body is respectively provided with a hollow water inlet body slidingly and vertically sleeved to the water inlet cavity and a hollow water outlet body vertically and slidingly sleeved to the water outlet cavity; the lower part sidewalls of the water inlet body and the water outlet body are respectively provided with a water inlet cooperating port and a water outlet cooperating port matched with the external water inlet and external water outlet.

The self-sealing assembly further includes a connecting plate, an upper ceramic sheet fixing plate sleeved in the middle part of the connecting plate and a lower ceramic sheet fixing seat, a limiting ring and a chuck sleeved successively from inside to outside; the lower ceramic sheet fixing seat and the limiting ring rotate in linkage; the inner circumference of the upper part of the chuck is provided with a sliding groove; the outer circumference of the limiting ring upper part is provided with a first protrusion matched with the sliding groove; and the upper outer ring of the chuck is fixedly disposed on the bottom of the shell at the same time; the lower ceramic sheet is fixedly embedded on the lower ceramic sheet fixing seat; the upper ceramic sheet is rotationally embedded above the lower ceramic sheet; the connecting plate, the upper ceramic sheet fixing plate and the upper ceramic sheet are snap-fitted successively from top to bottom; the upper part of the upper ceramic sheet fixing plate is provided with a connecting port; the connecting port penetrates the connecting plate and covers outside the outer ring of the water outlet of the inner core; the connecting plate is also fixedly connected to the chuck; one end of the through pipe communicates with the water outlet of the inner core, and the other end communicates with water outlet body.

Where, the upper end surface of the seat body is provided with an upwardly inclined guiding stage along the outer circumference; the bottom of the chuck is provided with a convex block along the outer circumference; the lower end surface of the convex block is matched with the guiding stage.

A second protrusion is arranged on the outer periphery of the lower part of the limiting ring; a groove matched with the second protrusion is arranged on the upper part of the sliding body.

The number of the guiding stage is two, and the two guiding stages are symmetrically arranged taking the center of the seat body as a center.

The elastic member is a spring.

A method of using the water machine with unaffected water purification under disassembly includes the following steps.

① Self-sealing of the filter element device: rotating the outer shell, the outer shell drives the upper ceramic sheet to rotate relative to the lower ceramic sheet through the connecting plate and the upper sheet ceramic fixing plate, and through ports of the upper ceramic sheet and the lower ceramic sheet are staggered, and the water outlet of the filter element main body is closed.

② Disassembly of the filter element device: continuing to rotate the outer shell, the convex block on the chuck slides obliquely upwards along the guiding stage on the seat body to make the chuck to move up, so that the filter element device moves upwards, and the sliding body slides upwards under the action of the spring to make the external water inlet and water inlet cooperating port to be staggered, and to make the external water outlet and water outlet cooperating port staggered, thereby the external water inlet and the external water outlet are directly connected; the water flows directly enter the next filter element or purified water outlet.

The present invention has the following beneficial effects.

1. The present invention can achieve the objective of disassembling and replacing the filter element main body under the normal working condition of the water machine, and prevent the water in filter element main body from leaking out during the disassembly process. The device has a compact structure, a small size and a stable operation.

2. The present invention can realize the relative fitting rotation of the upper and lower ceramic sheets by rotating the outer shell, so as to control the flow between two ceramic sheets to be connected or disconnected, and realize self-sealing, and can also control the water flow.

3. The self-sealing assembly provided by the present invention is compact and stable in structure, and is integrated with the filter element main body, so it can be replaced and disassembled integrally.

4. The filter element main body seat provided by the present invention can be made to automatically communicate with the water inlet and outlet of the filter element main body to perform filtration when the filter element main body is assembled. After the filter element main body is disassembled, water is automatically introduced into the next filter element main body without affecting the normal operation of the water machine.

5. The cooperation between the seat body and the sliding body of the present invention adopts a simple and stable structure to realize the switching of the water flow, leading to a smooth switching, a stable operation and a long service life.

6. The cooperation between the convex block and the guiding stage of the present invention, the filter element assembly can be combined more tightly, and at the same time, the removal is more easy.

The reference numbers in the drawings are as follows.

1—filter element main body, 11—inner core, 12—outer shell, 2—self-sealing assembly, 21—upper ceramic sheet, 22—lower ceramic sheet, 23—through port, 24—connecting plate, 25—upper ceramic sheet fixing plate, 251—connecting port, 26—lower ceramic sheet fixing seat, 27—limiting ring, 271—first protrusion, 272—second protrusion, 28—chuck, 281—convex block, 282—sliding groove, 3—seat body, 31—water inlet cavity, 32—water outlet cavity, 33—vertical sliding cavity, 34—external water inlet, 35—external water outlet, 36—water inlet cooperating port, 37—water outlet cooperating port, 38—guiding stage, 4—water flow switching assembly, 41—sliding body, 411—groove, 42—water inlet body, 43—water outlet body, 45—sleeving ring, 5—through pipe, 6—spring.

DETAILED DESCRIPTION

The present invention will be described in detail below with reference to the drawings and specific embodiments.

As shown in FIGS. 1 to 10, a water machine with unaffected water purification under disassembly, includes a filter element device and a filter element main body seat. The filter element device includes a filter element main body 1 and a self-sealing assembly 2 sleeved at the bottom of the filter element main body 1; the filter element main body 1 includes an inner core 11 and an outer shell 12 that can mutually rotate. A gap is provided between the inner core 11 and the shell 12 to accommodate the water flow. The self-sealing assembly 2 includes an upper ceramic sheet 21 and a lower ceramic sheet 22 that can mutually rotate in fitting contact with each other. The upper ceramic sheet 21 and the lower ceramic sheet 22 are respectively provided with a through port 23. The mutual fitting rotation between the upper ceramic sheet 21 and the lower ceramic sheet 22 can control the communication size between the two through ports 23, controlling not only the communication and cutting-off of the water flow, but also the rate of water flow; the through port 23 of the upper ceramic sheet 21 communicates with the water outlet of the filter element main body 1.

Figure 1:
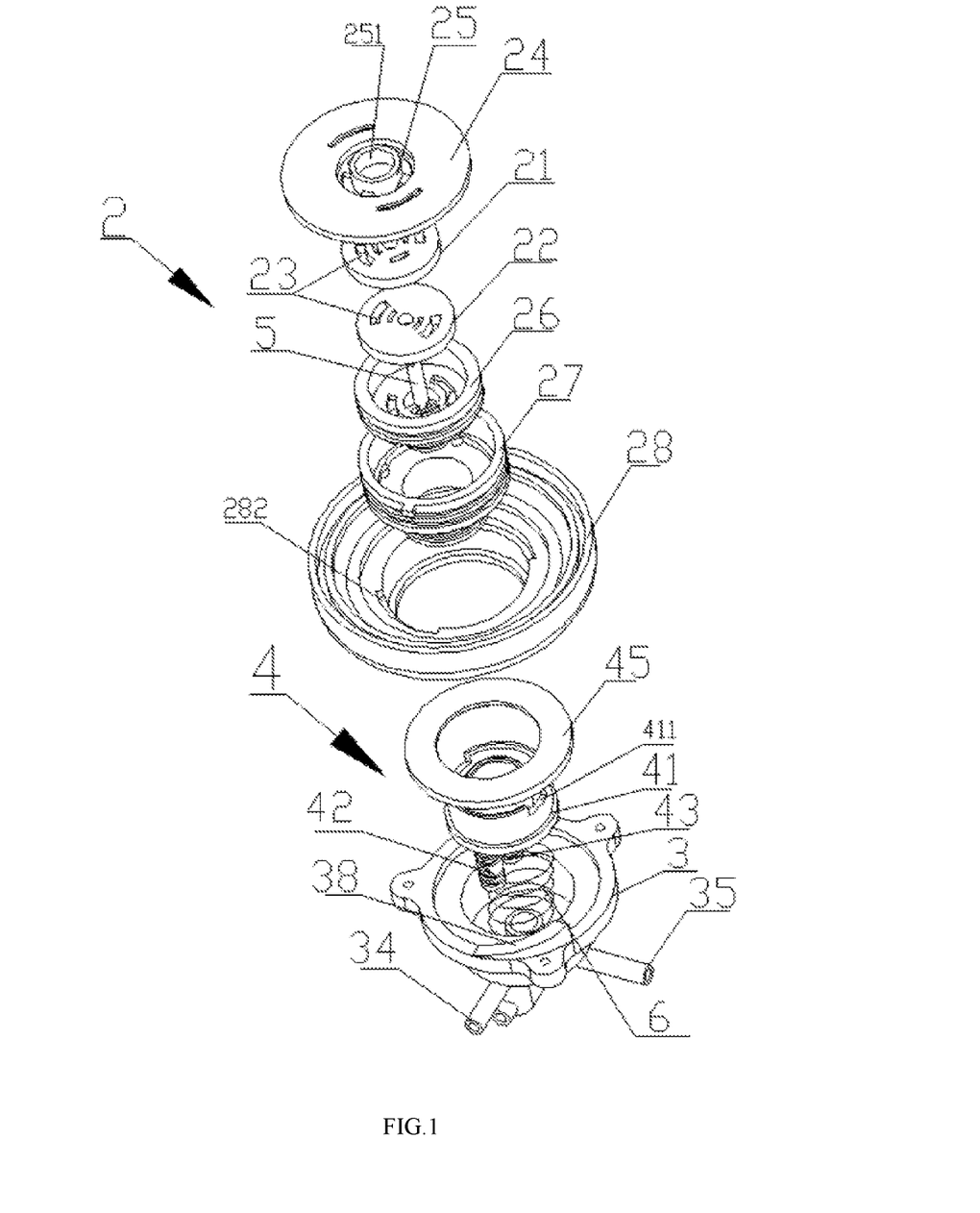
FIG. 1 is an explosive diagram of a self-sealing assembly and a filter element main body seat of the present invention.
Figure 2:
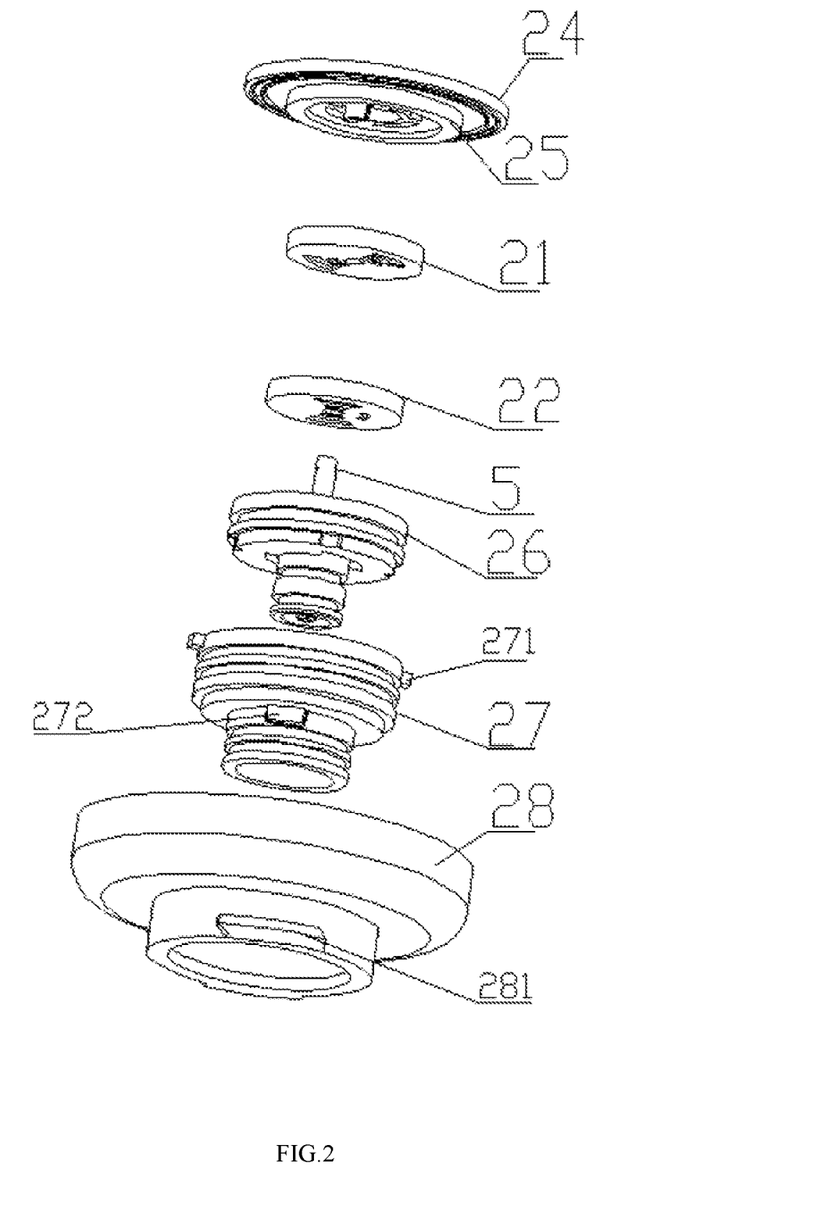
FIG. 2 is an explosive diagram of the self-sealing assembly of the present invention.

Further, as shown in FIG. 2, one of the upper ceramic sheet 21 and the lower ceramic sheet 22 is in linkage with the inner core 11, and the other is in linkage with the outer shell 12. Specifically, the self-sealing assembly 2 further includes a connecting plate 24, an upper ceramic sheet fixing plate 25 and the lower ceramic sheet fixing seat 26, the limiting ring 27 and the chuck 28 successively sleeved from inside to outside; the lower ceramic sheet fixing seat 26 and the limiting ring 27 mutually rotate in linkage by snap-fitting; the lower ceramic sheet 22 is fixedly embedded on the lower ceramic sheet fixing seat 26; the upper ceramic sheet 21 is rotationally embedded above the lower ceramic sheet 22 on the lower ceramic sheet fixing seat 26; the connecting plate 24, the upper ceramic sheet fixing plate 25 and the upper ceramic sheet 21 are successively snap-fitted from top to bottom; where, the upper part of the upper ceramic sheet fixing plate 25 is provided with a connecting port 251; the connecting port 251 penetrates the connecting plate 24 and covers the outer ring of the water outlet in the middle part of the inner core 11. The connecting plate 24 is also fixedly connected to the chuck 28, in this embodiment, the adhesive is used for molding. A through pipe 5 penetrates the self-sealing assembly 2 from bottom to top; the upper end of the through pipe 5 is inserted into the water outlet of the inner core 11 and communicates with the inner core 11, and the lower end communicates with the water outlet body 43.

Figure 3:
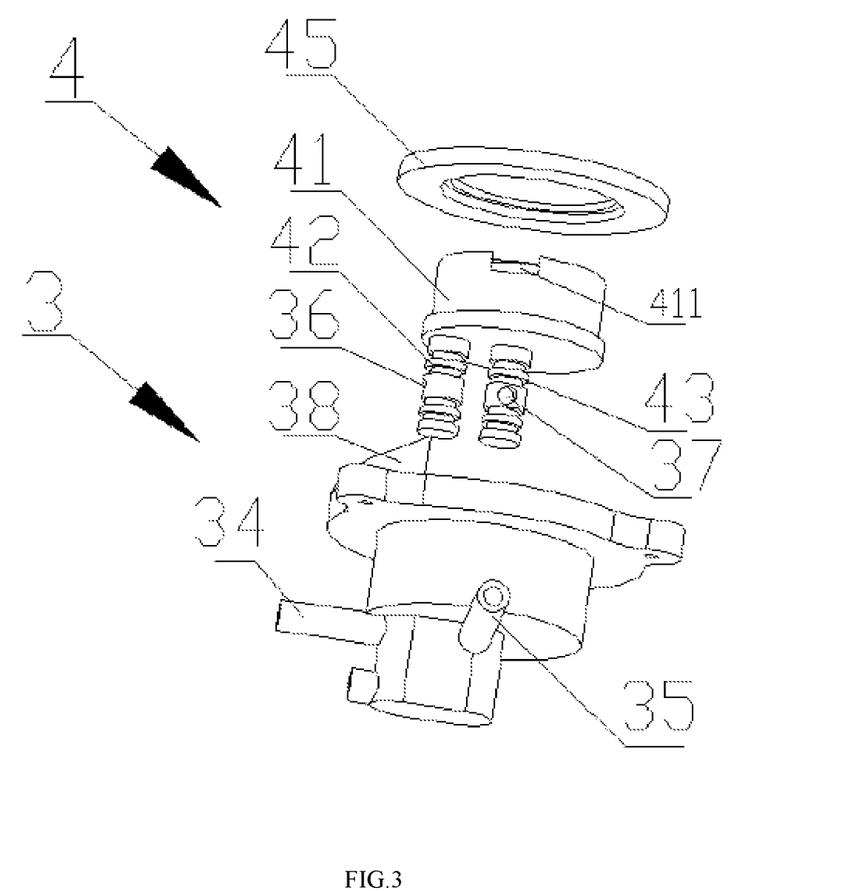
FIG. 3 is an explosive diagram of the filter element main body seat of the present invention.
Figure 4:
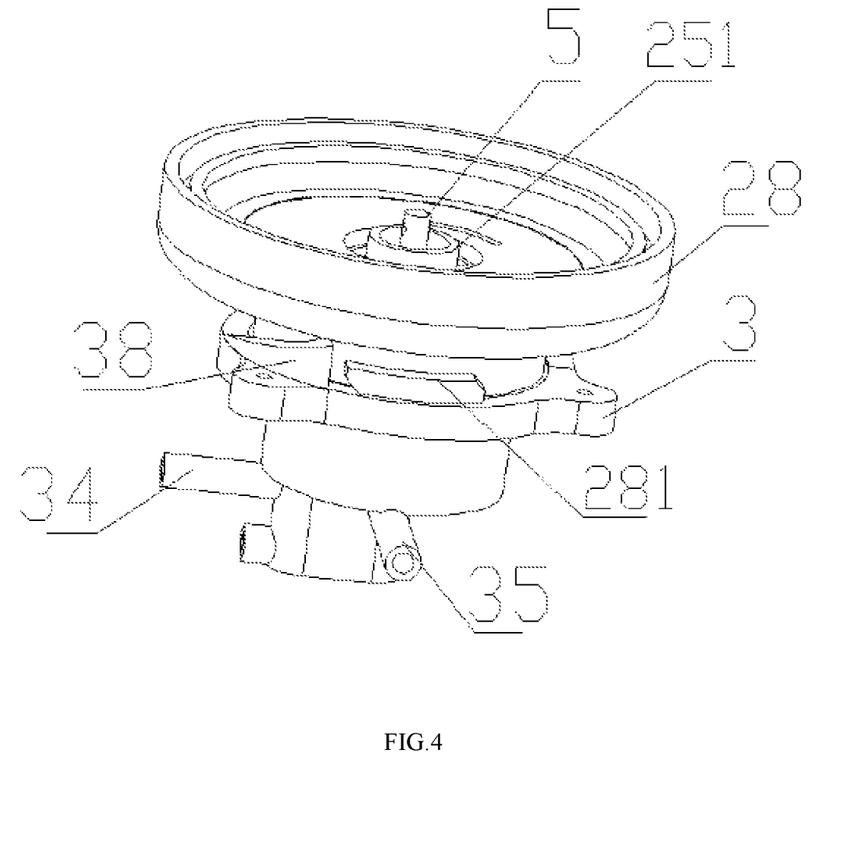
FIG. 4 is a schematic diagram of the combination of the self-sealing assembly and the filter element main body seat of the present invention.
Figure 5:
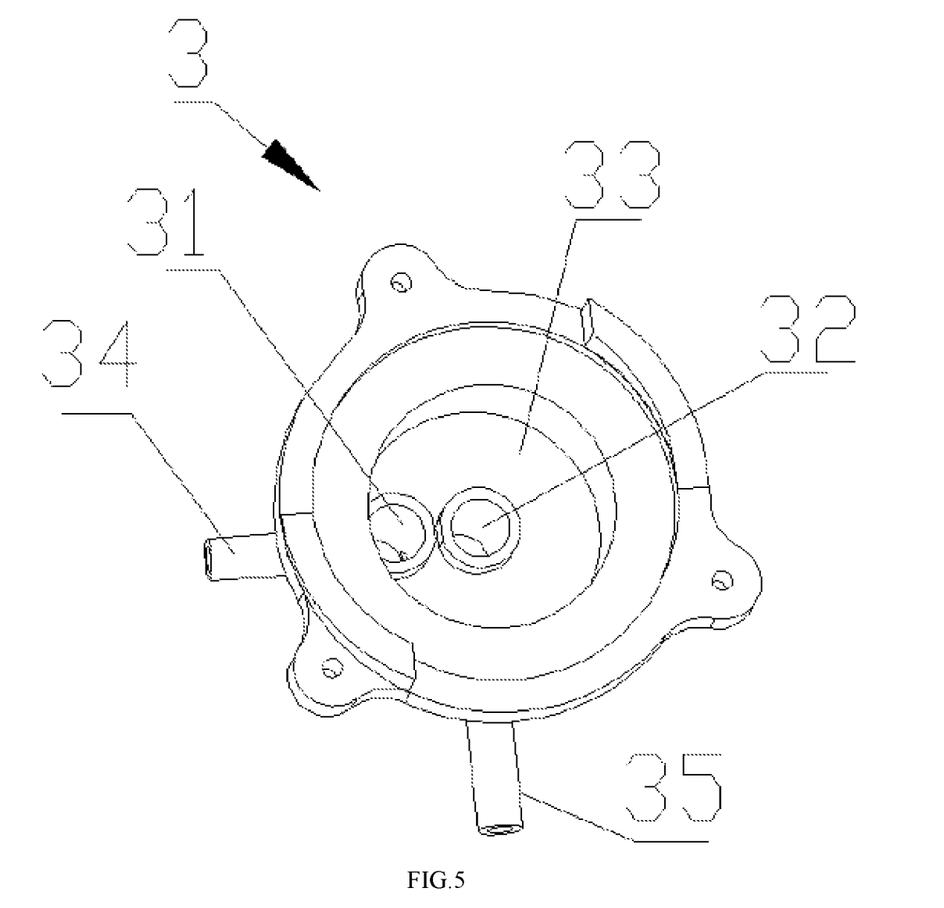
FIG. 5 is a schematic diagram of a seat body of the present invention.
Figure 6:
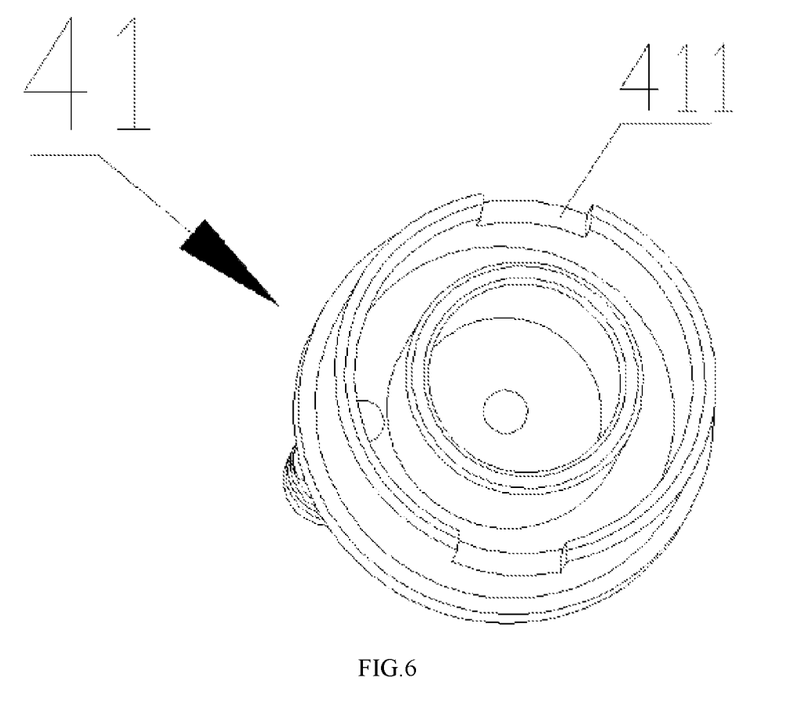
FIG. 6 is a schematic diagram of a sliding body of the present invention.
Figure 7:
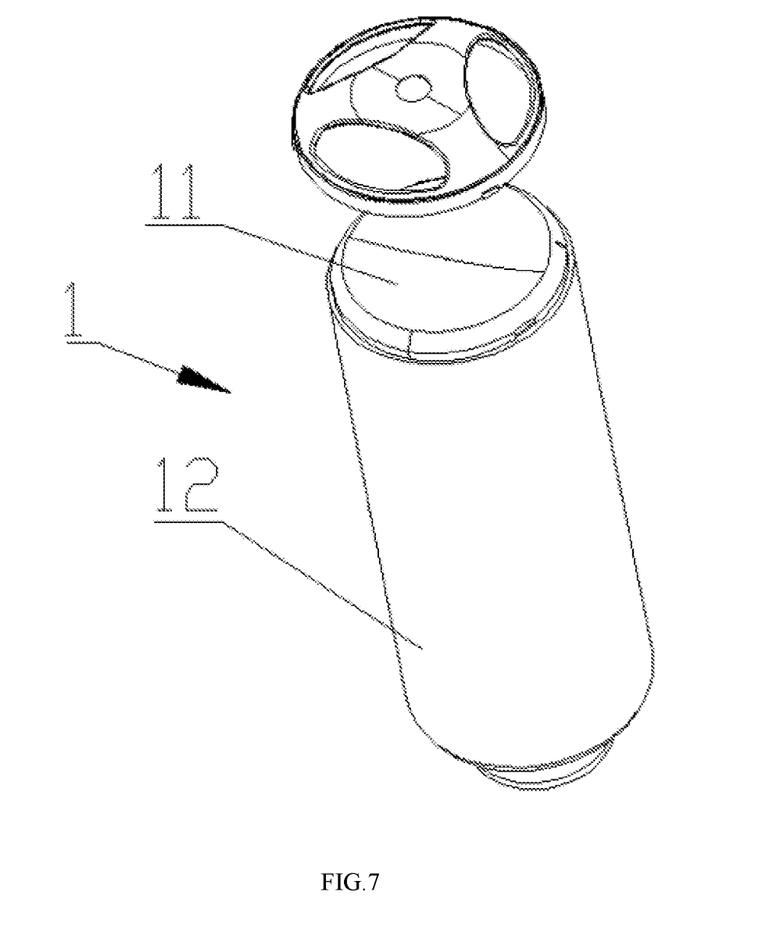
FIG. 7 is a schematic diagram of a filter element main body of the present invention.
Figure 8:
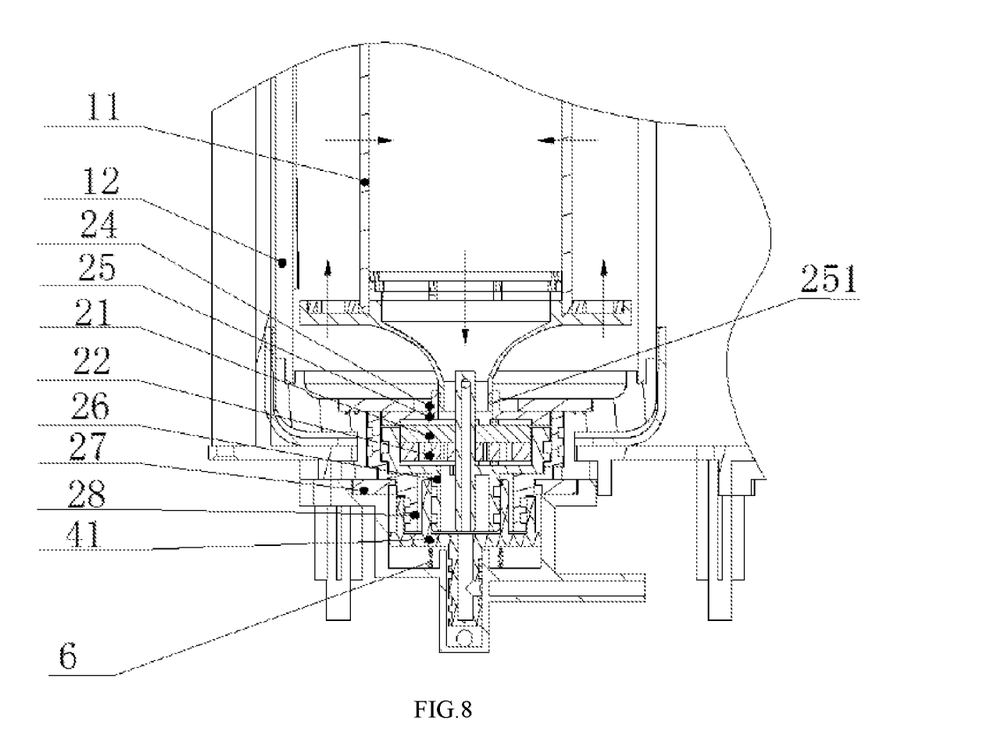
FIG. 8 is a sectional view of the cooperation of the filter element device and the filter element main body seat in the water machine of the present invention.

Further, as shown in FIGS. 2 to 4, a sliding groove 282 is arranged on the inner periphery of upper part of the chuck 28; a first protrusion 271 matched with the sliding groove 282 is arranged on the outer periphery of the upper part of the limiting ring 27; the length of the sliding groove 282 is greater than the width of the first protrusion 271 to ensure a certain degree of relative rotation of the first protrusion 271 in the sliding groove 282; the outer circumference of the lower part of the limiting ring 27 is provided with a second protrusion 272; the upper part of the sliding body 41 is provided a groove 411 matched with the second protrusion 272; the outer ring of the upper part of the chuck 28 is fixedly disposed at the bottom of the outer shell 12 at the same time, thereby the outer shell 12 rotates to drive the chuck 28 to rotate, and then the connecting plate 24 is driven to rotate, thereby driving the upper ceramic sheet fixing plate 25, finally the upper ceramic sheet 21 is driven to rotate; the upper end surface of the seat body 3 is provided with an upwardly inclined guiding stage 38 along the outer periphery; the number of the guiding stage 38 is two, and the two guiding stages are symmetrically arranged taking the center of the seat body 3 as a center; the bottom of the chuck 28 is provided with a convex block 281 along the periphery; the convex block 281 is snap-fitted with the shell body of water machine to fix the filter element main body 1, and the lower end surface of the convex block 281 can also cooperate with the guiding stage 38, the chuck 28 gradually moves upward along guiding stage 38 when it rotates to make the second protrusion 272 removed from the groove 411. The arrangement that the length of the sliding groove 282 is greater than the width of the first protrusion 271 can ensure smooth rotation of the chuck 28 during the removal process, and can also make the lower ceramic sheet fixing seat 26 and the upper ceramic sheet fixing plate 25 have a space for relative rotation through a certain relative rotation of the chuck 28 and the limiting ring 27, so that the upper ceramic sheet 21 and the lower ceramic sheet 22 can rotate relatively.

Furthermore, as shown in FIGS. 1, 3, 5, 6, and 8, the filter element main body seat includes a seat body 3 snap-fitted to the filter element device and a water flow switching assembly 4 disposed in the seat body 3; the water flow switching assembly 4 includes a sliding body 41 slidingly and vertically sleeved on the seat body 3, an elastic member (not shown in the figure) and the sleeving ring 45 that limits the sliding distance of the sliding body 41 to prevent the sliding body 41 from dropping off, the elastic member may be elastic silicone or spring, etc. In this embodiment, the elastic member is a spring 6; the sliding body 41 compresses the elastic member and communicates the external water inlet 34 on the seat body 3 with the water inlet of the filter element main body 1, and also communicates the external water outlet 35 on the seat body 3 with through port 23 of the lower ceramic sheet 22; when the elastic member recovers, the communication between the external water inlet 34 and the water inlet of the filter element main body 1, and the communication between the external water outlet 35 and the through port 23 of the lower ceramic sheet 22 are both disconnected, the external water inlet 34 is in direct communication with external water outlet 35.

Figure 9:
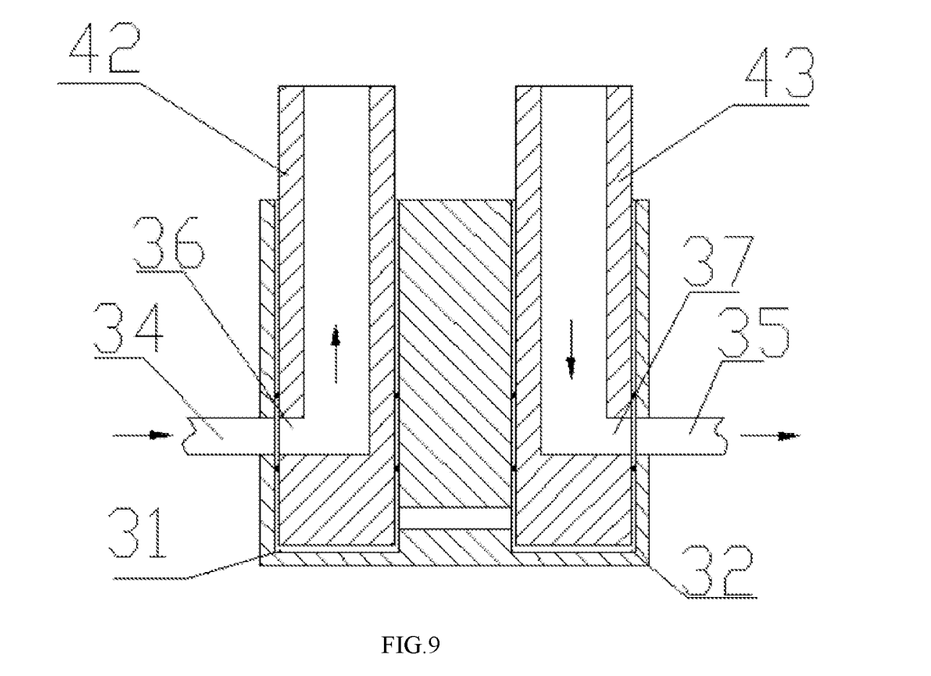
FIG. 9 is a schematic diagram of a waterway of the seat body and the sliding body of the present invention in a normal water purification state.

Specifically, the bottom of the seat body 3 is provided with a water inlet cavity 31 and a water outlet cavity 32 vertically, and vertical sliding cavity 33 is provided at the upper part; the water inlet cavity 31, the water outlet cavity 32 and the sliding cavity 33 are all vertically opened cylinders. The water inlet cavity 31 and the water outlet cavity 32 are parallelly arranged and extend downwards from the bottom of the sliding cavity 33. The water inlet cavity 31 communicates with the bottom of the water outlet cavity 32. The sidewalls above the communicating portion respectively communicate with the external water inlet 34 and the external water outlet 35. The bottom of the sliding body 41 is provided with a hollow water inlet body 42 vertically and slidingly sleeved on the water inlet cavity 31 and a hollow water outlet body 43 vertically and slidingly sleeved on the water outlet cavity 32; the water inlet body 42 and the water outlet body 43 are both the cylindrical shapes matched with the water inlet cavity 31 and water outlet cavity 32, as shown in FIG. 9, the lower sidewalls of the water inlet body 42 and the water outlet body 43 are respectively provided with a water inlet cooperating port 36 on the same vertical plane as the external water inlet 34 and a water outlet cooperating port 37 on the same vertical plane as the water external outlet 35; the outer peripheries of the water inlet body 42 and the water outlet body 43 move up and down relative to the water inlet cooperating port 36 and the water outlet cooperating port 37 are respectively provided with a sealing ring tightly hooped.

A method of using the water machine with unaffected water purification under disassembly includes the following steps.

①Self-sealing of the filter element device: rotating outer shell 12, outer shell 12 drives the upper ceramic sheet 21 to rotate relative to the lower ceramic sheet 22 through connecting plate 24 and upper ceramic sheet fixing plate 25, the through ports 23 of the upper ceramic sheet 21 and the lower ceramic sheet 22 are staggered, and the water outlet of the filter element main body 1 is closed.

②Disassembly of the filter element: continuing to rotate the outer shell 12, the convex block 281 on the chuck 28 slides obliquely and upward along the guiding stage 38 on the seat body 3 to make the chuck 28 move upward, so that the filter element device moves upwards, the sliding body 41 slides upwardly under the action of the spring 6 to make the external water inlet 34 and the water inlet cooperating port 36 to be staggered, and make the external water outlet 35 and the water outlet cooperating port 37 staggered, so that the external water inlet 34 directly communicates with the external water outlet 35; the water flow directly enters the next filter element or purified water outlet.

The working principle of the present invention.

By rotating the outer shell 12, the outer shell 12 drives the chuck 28 to rotate, and the chuck 28 drives the upper ceramic sheet 21 to rotate through the connecting plate 24 and the upper ceramic sheet fixing plate 25; therefore, the lower ceramic sheet 22 rotates relative to the upper ceramic sheet 21, so as to adjust the water yield and the yielding water of the filter element main body in open and closed state, and prevent the filter element main body from leaking water during disassembly.

Figure 10:
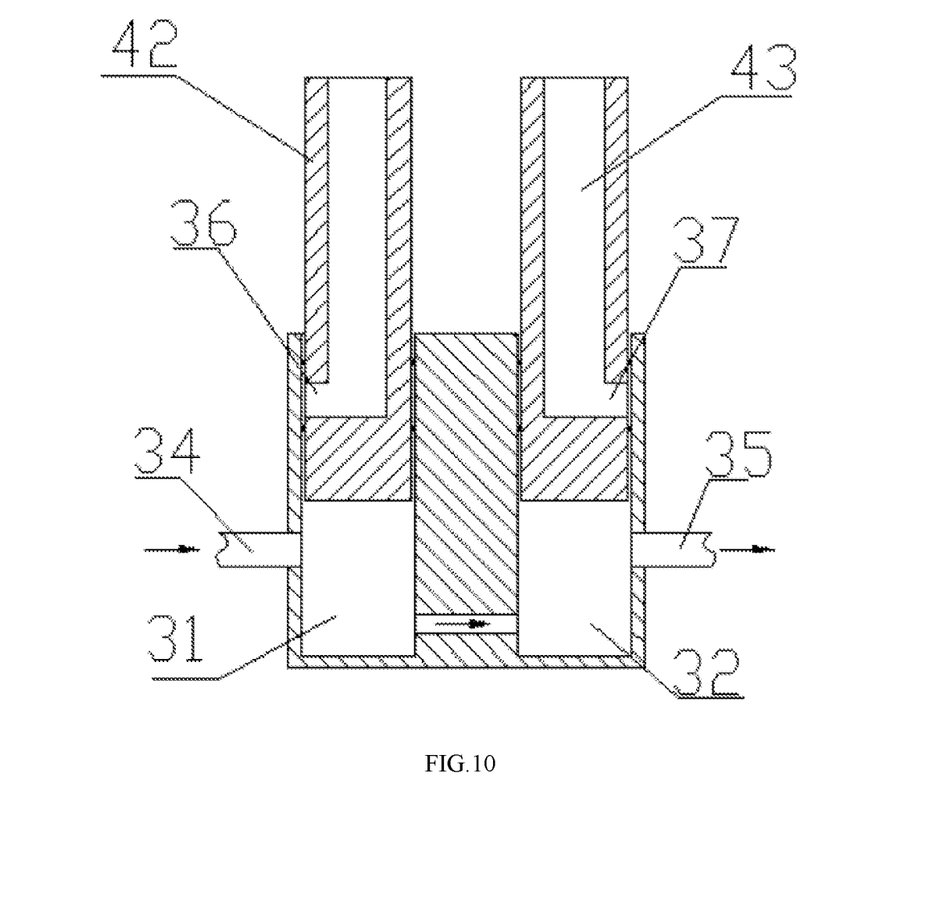
FIG. 10 is a schematic diagram of a waterway of the seat body and the sliding body of the present invention when the filter element is disassembled.

Continuing to rotate the chuck 28, the convex block 281 of the chuck 28 is removed from the snap-fitting with the shell body of the water machine and contacts the guiding stage 38 and moves upward along the guiding stage 38, so as to make the filter element main body move upward, as shown in FIG. 10, after the filter element main body moves upwards, the sliding body 41 moves upwards under the restoring force of the elastic member to disconnect the communication between the water inlet cooperating port 36 and the external water inlet 34 and the communication between the water outlet cooperating port 37 and the external water outlet 35, and a room is made for the communication position of the water inlet cavity 31 and the water outlet cavity 32 to make the water inlet cavity 31 directly communicate with the water outlet cavity 32, and the water flow directly enters into the next filter element main body.

When the filter element main body works normally, water flow enters into the water inlet cavity 31 from the external water inlet 34 and passes through the water inlet cooperating port 36 to enter into the water inlet body 42, and then successively passes through the lower ceramic sheet 22 and the upper ceramic sheet 21 to enter into a space enclosed by the outer shell 12 and the inner core 11. Then the water flow enters into the inner core 11 and passes through the through pipe 5 to enter into the water outlet body 43, then comes out from the water outlet cooperating port 36 and to the water outlet cavity 32, and outflows from the external water outlet 35.

The above mentioned descriptions are merely embodiments of the present invention, and are not intended to limit the protection scope of the present invention. Any equivalent structure or equivalent process transformation using the specification and drawings of the present invention, directly or indirectly applied to other related technology fields all fall within the protection scope of the present invention.

What is claimed is:

1. A water machine with unaffected water purification under disassembly, comprising:
    a filter element device and a filter element main body seat, wherein
    the filter device comprises a filter element main body and a self-sealing assembly, the self-sealing assembly is sleeved on a bottom of the filter element main body;
    the filter element main body comprises an inner core and an outer shell, the inner core and the outer shell can mutually rotate;
    the self-sealing assembly comprises an upper ceramic sheet and a lower ceramic sheet, the upper ceramic sheet and the lower ceramic sheet are separate sheets and can mutually rotate in a fitting contact; each of the upper ceramic sheet and the lower ceramic sheet is provided with a through port; the through port of the upper ceramic sheet communicates with a water outlet of the filter element main body; one of the upper ceramic sheet and the lower ceramic sheet is in linkage with the inner core, and the other one of the upper ceramic sheet and the lower ceramic sheet is in linkage with the outer shell;
    the filter element main body seat comprises a seat body and a water flow switching assembly, the seat body is snap-fitted with the filter element device, and the water flow switching assembly is arranged in the seat body;
    the water flow switching assembly comprises a sliding body and a spring, the sliding body and the spring are vertically and slidingly sleeved on the seat body; the slide body compresses the spring to slide up and down, so that in a water purification state, an external water inlet on the seat body communicates with a water inlet of the filter element main body, and an external water outlet on the seat body communicates with the through ports of the lower ceramic sheet and the upper ceramic sheet; so that in a disassembly state of the filter element main body, a communication between the external water inlet and the water inlet of the filter element main body—and a communication between the external water outlet and the through port of the lower ceramic sheet are both disconnected, and the external water inlet is in a direct communication with the external water outlet.

2. The water machine with unaffected water purification under disassembly according to claim 1, wherein
    a bottom of the seat body is vertically provided with a water inlet cavity and a water outlet cavity, and an upper part of the seat body is provided with a vertical sliding cavity; the water inlet cavity communicates with a bottom of the water outlet cavity, and the water inlet cavity and the water outlet cavity respectively communicate with the external water inlet and the external water outlet;
    a bottom of the sliding body is respectively provided with a hollow water inlet body and a hollow water outlet body, the hollow water inlet body is vertically and slidingly sleeved on the water inlet cavity, and the hollow water outlet body is vertically and slidingly sleeved on the outlet water cavity; a sidewall of a lower part of the water inlet body is provided with a water inlet cooperating port matched with the external water inlet, and a sidewall of a lower part of the water outlet body is provided with a water outlet cooperating port matched with the external water outlet.

3. The water machine with unaffected water purification under disassembly according to claim 2, wherein
    the self-sealing assembly further comprises a connecting plate, an upper ceramic sheet fixing plate and a lower ceramic sheet fixing seat, a limiting ring and a chuck, the upper ceramic sheet fixing plate is sleeved on a middle part of the connecting plate, and the lower ceramic sheet fixing seat, the limiting ring and the chuck are successively sleeved from inside to outside; the lower ceramic sheet fixing seat and the limiting ring are in a linkage rotation; a sliding groove is arranged on an upper inner periphery of the chuck; a first protrusion matched with the sliding groove is arranged on an upper outer periphery of the limiting ring; an outer ring of an upper part of the chuck is fixedly disposed at a bottom of the outer shell at the same time; the lower ceramic plate is fixedly embedded on the lower ceramic sheet fixing seat; the upper ceramic sheet is rotationally embedded above the lower ceramic sheet; the connecting plate, the upper ceramic sheet fixing plate and the upper ceramic sheet are successively snap-fitted from top to bottom;

an upper part of the upper ceramic sheet fixing plate is provided with a connecting port;

the connecting port penetrates the connecting plate and covers outside an outer ring of a water outlet of the inner core; the connecting plate is also fixedly connected to the chuck; one end of a through pipe communicates with the water outlet of the inner core, and the other end of the through pipe communicates with the water outlet body.

4. The water machine with unaffected water purification under disassembly according to claim 3, wherein an upper end surface of the seat body is provided with an inclined upward guiding stage along an outer circumference of the seat body; a bottom of the chuck is provided with a convex block along an outer circumference; a lower end surface of the convex block matches with the inclined upward guiding stage.

5. The water machine with unaffected water purification under disassembly according to claim 4, wherein a second protrusion is disposed at an outer circumference of a lower part of the limiting ring; an upper part of the sliding body is provided with a groove matched with the second protrusion.

6. The water machine with unaffected water purification under disassembly according to claim 5, wherein two inclined upward guiding stages are provided, the two inclined upward guiding stages are symmetrically arranged along a center of the seat body.

7. A method of using the water machine with unaffected water purification under disassembly according to claim 1, comprising the following steps:

self-sealing of the filter element: rotating the outer shell, and wherein the outer shell drives the upper ceramic sheet to rotate relative to the lower ceramic sheet through a connecting plate and an upper ceramic sheet fixing plate, and the through ports of the upper ceramic sheet and the lower ceramic sheet are staggered, closing a water outflow of the filter element main body;

disassembly of the filter element device: continuing to rotate the outer shell, and wherein a convex block on a chuck slides obliquely upward along a inclined upward guiding stage on the seat body to make the chuck move upwards, so that the filter element device moves upwards, and the sliding body slides upwards under an action of a spring, so that the external water inlet and a water inlet cooperating port are staggered, and the external water outlet and a water outlet cooperating port are staggered, so that the external water inlet directly communicates with the external water outlet; a water flow directly enters into a next filter element or a purified water outlet.

8. The method of using the water machine with unaffected water purification under disassembly according to claim 7, wherein in the water machine, a bottom of the seat body is vertically provided with a water inlet cavity and a water outlet cavity, and an upper part of the seat body is provided with a vertical sliding cavity; the water inlet cavity communicates with a bottom of the water outlet cavity, and the water inlet cavity and the water outlet cavity respectively communicate with the external water inlet and the external water outlet; a bottom of the sliding body is respectively provided with a hollow water inlet body and a hollow water outlet body, the hollow water inlet body is vertically and slidingly sleeved on the water inlet cavity, and the hollow water outlet body is vertically and slidingly sleeved on the outlet water cavity; a sidewall of a lower part of the water inlet body is provided with the water inlet cooperating port matched with the external water inlet, and a sidewall of a lower part of the water outlet body is provided with the water outlet cooperating port matched with the external water outlet.

9. The method of using the water machine with unaffected water purification under disassembly according to claim 7, wherein in the water machine, the self-sealing assembly further comprises the connecting plate, the upper ceramic sheet fixing plate and a lower ceramic sheet fixing seat, a limiting ring and the chuck, the upper ceramic sheet fixing plate is sleeved on a middle part of the connecting plate, and the lower ceramic sheet fixing seat, the limiting ring and the chuck are successively sleeved from inside to outside; the lower ceramic sheet fixing seat and the limiting ring are in a linkage rotation; a sliding groove is arranged on an upper inner periphery of the chuck; a first protrusion matched with the sliding groove is arranged on an upper outer periphery of the limiting ring; an outer ring of an upper part of the chuck is fixedly disposed at a bottom of the outer shell at the same time; the lower ceramic plate is fixedly embedded on the lower ceramic sheet fixing seat; the upper ceramic sheet is rotationally embedded above the lower ceramic sheet; the connecting plate, the upper ceramic sheet fixing plate and the upper ceramic sheet are successively snap-fitted from top to bottom;

an upper part of the upper ceramic sheet fixing plate is provided with a connecting port; the connecting port penetrates the connecting plate and covers outside an outer ring of a water outlet of the inner core; the connecting plate is also fixedly connected to the chuck; one end of a through pipe communicates with the water outlet of the inner core, and the other end of the through pipe communicates with the water outlet body.

10. The method of using the water machine with unaffected water purification under disassembly according to claim 7, wherein in the water machine, an upper end surface of the seat body is provided with the inclined upward guiding stage along an outer circumference of the seat body; a bottom of the chuck is provided with the convex block along an outer circumference of the chuck; a lower end surface of the convex block matches with the inclined upward guiding stage.

11. The method of using the water machine with unaffected water purification under disassembly according to claim 7, wherein in the water machine, a second protrusion is disposed at an outer circumference of a lower part of the limiting ring; an upper part of the sliding body is provided with a groove matched with the second protrusion.

12. The method of using the water machine with unaffected water purification under disassembly according to claim 7, wherein in the water machine, two inclined upward guiding stages are provided, the two inclined upward guiding stages are symmetrically arranged along a center of the seat body.

13. The method of using the water machine with unaffected water purification under disassembly according to claim 7, wherein in the water machine, the elastic member is the spring.

* * * * *